United States Patent [19]
Omtzigt

[11] Patent Number: 6,115,682
[45] Date of Patent: Sep. 5, 2000

[54] APPARATUS FOR ANALYZING THE PERFORMANCE OF A COMPUTER SYSTEM

[75] Inventor: E. Theodore L. Omtzigt, Eldorado Hills, Calif.

[73] Assignee: Intel Corporation, Santa Clara, Calif.

[21] Appl. No.: 08/998,088

[22] Filed: Dec. 24, 1997

[51] Int. Cl.[7] .................................................. G06F 15/16
[52] U.S. Cl. ................................... 702/188; 702/186
[58] Field of Search .................................. 702/188, 186, 702/182; 714/37, 38, 39

[56] References Cited

U.S. PATENT DOCUMENTS

| | | | |
|---|---|---|---|
| 3,868,480 | 2/1975 | Murgio et al. | 179/8 A |
| 5,537,541 | 7/1996 | Wibecan | 395/183.21 |
| 5,581,482 | 12/1996 | Wiedenman et al. | 364/551.01 |
| 5,687,376 | 11/1997 | Celi, Jr. et al. | 395/704 |
| 5,701,394 | 12/1997 | Arita et al. | 395/11 |
| 5,729,472 | 3/1998 | Seiffert et al. | 364/550 |
| 5,740,409 | 4/1998 | Deering | 395/503 |
| 5,751,945 | 5/1998 | Levine et al. | 395/184.01 |
| 5,752,062 | 5/1998 | Gover et al. | 355/800 |
| 5,793,977 | 8/1998 | Schmidt | 395/200.54 |
| 5,835,705 | 11/1998 | Larsen et al. | 395/184.01 |
| 5,852,354 | 12/1998 | Andrews | 318/562 |

*Primary Examiner*—Tuan T. Lam
*Assistant Examiner*—Linh Nguyen
*Attorney, Agent, or Firm*—Leo V. Navakoski

[57] ABSTRACT

A programmable apparatus is provided that performs real time observation of signals associated with operation of a computer system's resources through the system logic. The apparatus includes a command interface that receives event-monitoring instructions and an observation module that is coupled to the command interface. The observation module monitors signals generated by one or more resources in the computer system and processes these signals according to the received event-monitoring instructions.

12 Claims, 10 Drawing Sheets

RESET
START/STOP
SAMPLE
SAMPLE & RESET
SAMPLE & STOP

SET_EVENT_FOR_
SELECTOR

SET_CO-OCCURRENCE

SET_LATENCY_EXP
SET_QUEUE_EXP
SET_BANDWIDTH_EXP

APPARATUS FOR ANALYZING THE PERFORMANCE OF A COMPUTER SYSTEM

RELATED APPLICATIONS

This application is related to U.S. patent application Ser. No. 08/998,417, entitled System for Analyzing Graphics Controller Performance, filed on Dec. 24, 1997 and assigned to the same assignee.

BACKGROUND OF THE INVENTION

1. Technical Field

The present invention relates to the field of computer systems, and in particular to devices for analyzing the performance of computer systems.

2. Background Art

Modern computer systems are typically configured as multiple resources that communicate through a bus system. These resources may include a central processing unit (processor), memory, graphics system, and I/O devices. In many instances, system logic is coupled to the bus system to regulate transactions among the resources. Real-time observations of these transactions provide useful information about the system's efficiency and potential bottlenecks in data flow among system resources. This information includes, for example, the average number of instructions in a resource queue, the latency of a request operation, and the frequency with which transactions between one pair of resources are stalled by transactions between another pair of resources. This information may be used by both hardware and software designers to improve system performance.

In many instances, understanding performance bottlenecks requires relatively complex operations. For example, pinpointing pathological operations may require detecting concurrent transactions between different pairs of resources. Collisions between these concurrent transactions can indicate device or instruction interactions that are not apparent when monitoring either event separately. Latency experiments must track the time difference between the arrival of a request signal and the completion of the requested action. Where multiple resources share a transaction queue, it may be difficult to disentangle signals for the different resources, and complex analyses of available signals may be required to obtain the desired information.

Currently available methods for monitoring events in computer systems are limited by the types of signals that can be observed and the ease with which observations can be made. Logic analyzers are general purpose devices that can be set up to monitor the state of selected external signal lines when a specified instruction is detected. Here, "external signals" refers to those signals that are transferred on a bus or other readily accessible signal line. Events represented by signals internal to chip or system are not available for analysis by logic analyzers, and more sophisticated operations, such as detecting concurrent events involving non-external signals, are precluded with logic analyzers. These devices are also relatively expensive and complex to operate, limiting their use to engineers who design and debug the hardware.

Various programmable logic devices (PLDs) can also be used to monitor the operation of system hardware. These are usually designed for specific hardware devices and are complex to use. In addition, PLDs, like logic analyzers only have access to external signals.

There is thus a need for a transparent system capable of monitoring computer systems at a sufficiently detailed level to provide meaningful feedback on resource performance without need for complex interfacing and analysis procedures.

SUMMARY OF THE INVENTION

The present invention is an apparatus for monitoring a computer system to elucidate performance bottlenecks and the like. The apparatus is programmable to perform real time observation of signals associated with operation of the system resources through, for example, the system logic.

An apparatus in accordance with the present invention includes a command interface that receives event-monitoring instructions and an observation module that is coupled to the command interface. The observation module monitors signals generated by one or more resources in the computer system and processes these signals according to the received event-monitoring instructions.

In one embodiment of the invention, the observation module includes one or more programmable input selectors that are controlled by the command interface to route specified signals to analysis logic. The observation module may include a co-occurrence logic unit (CLU) for detecting the co-occurrence of specified signals in the computer system. The analysis logic may include an addend generator that is programmable to extract, for example, throughput, bandwidth, and queue depth data from the specified signals.

BRIEF DESCRIPTION OF THE DRAWINGS

The present invention may be understood with reference to the following drawings in which like elements are indicated by like numbers. These drawings are provided to illustrate selected embodiments of the present invention and are not intended to limit the scope of the invention.

DETAILED DISCUSSION OF THE INVENTION

Figure 1:
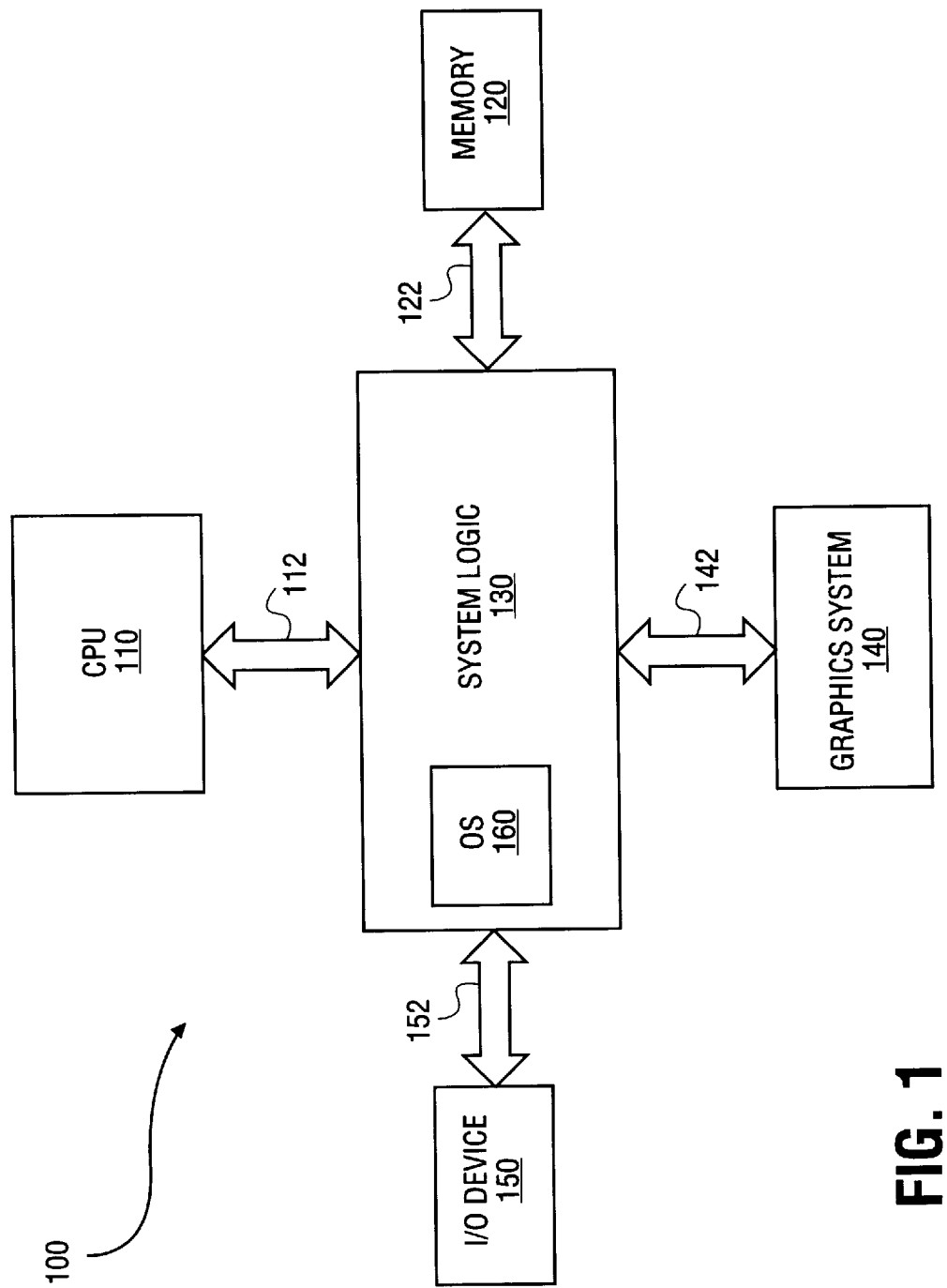
FIG. 1 is a block diagram of a computer system in which the present invention may be implemented.

The following discussion sets forth numerous specific details to provide a thorough understanding of the invention. Those of ordinary skill in the art having the benefit of this disclosure will appreciate that the invention may be practiced without these specific details. Various well known methods, procedures, components, and circuits have not been described in detail in order to focus attention on the features of the present invention.

The present invention is an observation system for monitoring the performance of various resources in a computer system through signals associated with transactions among the resources. These signals include, for example, transaction requests and responses that control the flow of data among the resources of the computer system, as well as signals indicating the status of specific resources in the computer system. The observation system includes an observation module and a command interface that controls the observation module in accordance with an instruction set architecture (ISA). The command interface decodes event monitoring instructions of the ISA, generates appropriate control signals to components of the observation module, and retrieves data collected by the observation module.

The observation module identifies transactions between resources in the computer system, generates signals that characterize the identified transactions (event input signals), processes the event input signals to identify specified, e.g. user defined, events (event signals), and analyzes the event signals to provide higher level information on the system's operation. Generation, selection, characterization, processing, and analysis modules may be pipelined to provide higher performance.

In one embodiment of the observation system, various signals in a computer system may be characterized according to the corresponding types of transactions, amounts of data being transferred, and the types of data being transferred. These characteristics are represented by one or more event input signals. Event input signals may be generated in response to external signals, such as bus transactions and the like (universal signals). Event input signal may also be generated in response to signals specific to particular resource or chipset architectures (architecture specific signals).

In the following discussion, the observation system is described with reference to a generalized system logic device, its bus interfaces, and its attendant signals. This is done to illustrate the features of the observation system and is not intended to limit the scope of the present invention to the specific resources or system logic device disclosed. For example, the present invention may be used with various buses, graphics controller, processors, and memory structures. Similarly, the disclosed computer system (FIG. 1) is one of many system configurations that may include resources suitable for analysis with the present invention and is described for purposes of illustration only.

Referring first to FIG. 1, there is shown a computer system 100 including resources that may be monitored using the present invention. Computer system 100 includes a processor 110, a memory 120, system logic 130, a graphics controller 140, and I/O device 150. System logic 130 couples data among processor 110, memory 120, graphics controller 140, and I/O device 150 through buses 112, 122, 142, and 152, respectively. System 100 is provided solely for purposes of illustration, and configurations other than that shown in FIG. 1 are also suitable for use with the present invention. For example, multiple processors (110) may be coupled to system logic 130 and different bus systems may be employed to couple the various resources. In one configuration, graphics controller 140 use a combination of buses/connections to communicate with system logic 130, as indicated by the dashed line in the figure. For example, graphic port 142 may be the Advanced Graphics Port (AGP) and I/O bus 152 may be a Peripheral Component Interface (PCI) bus.

Also shown in FIG. 1 is an observation system 160 in accordance with the present invention for monitoring the performance of computer system 100. In the disclosed embodiment, observation system 160 is shown as a module within system logic 130, but this is not required. For example, observation system 160 may be implemented as a separate module coupled to system logic 130 by a dedicated bus or other communication channel.

Figure 2:
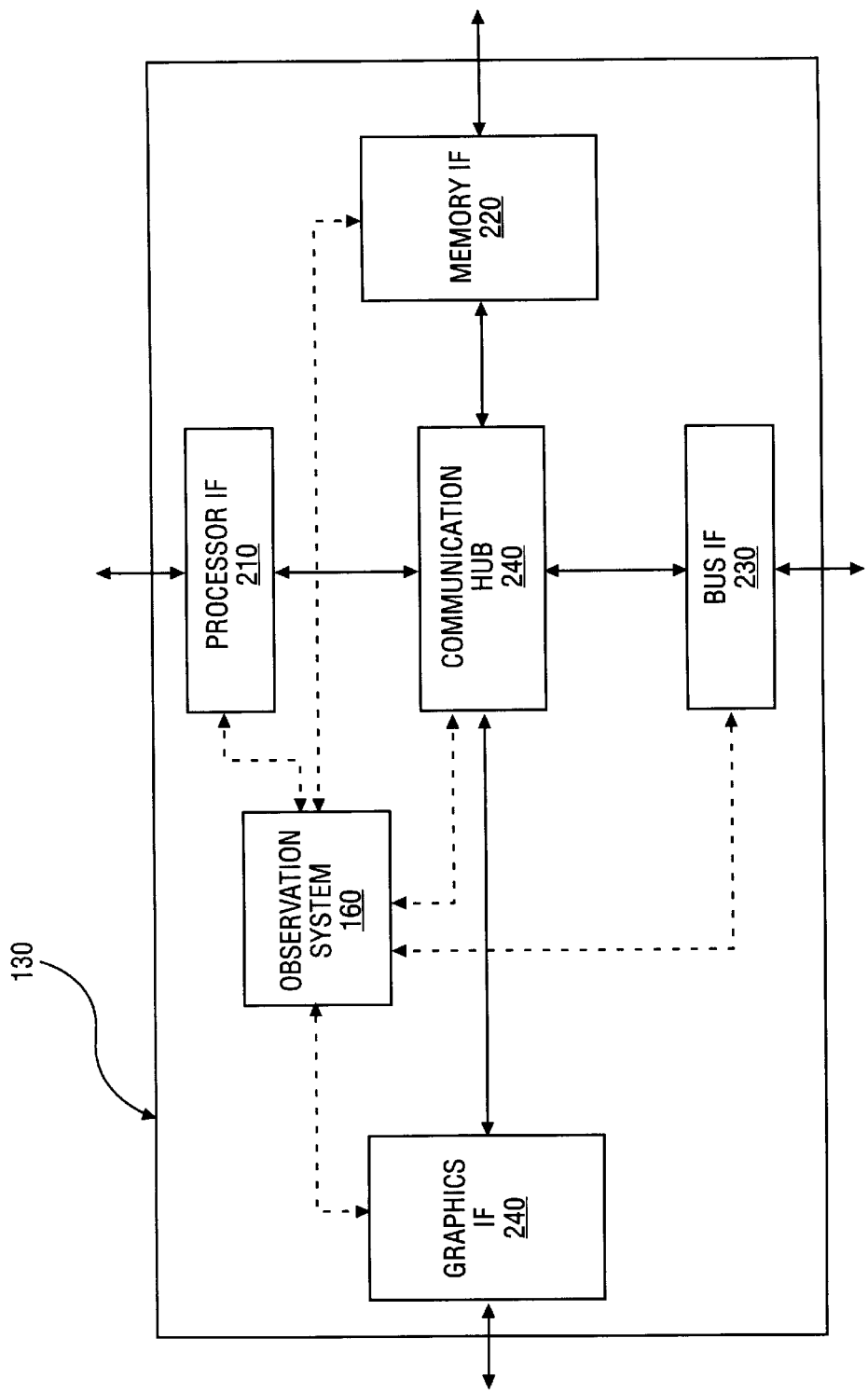
FIG. 2 is a block diagram of a generalized system logic device suitable for analysis by the present invention.

Referring now to FIG. 2, there is shown a block diagram representing the components typically present in system logic 130. These include a processor interface (IF) 210, a memory IF 220, a peripheral bus IF 230, a graphics port IF 240, and a communications hub 250. Although these components are typical in system logic 130, they are not required by the present invention, which may be implemented with various combinations and subsets of these components and other components not indicated in the figure.

Processor IF 210, memory IF 220, peripheral bus IF 230, and graphics port IF 240 include logic for generating and decoding signals on processor bus 112, memory bus 122, peripheral bus 132, and graphics port 142, respectively. Communications hub 150 includes circuitry for routing transaction data among interfaces 210, 220, 230, 240. Additional circuitry, buffers, and queues (not shown) are provided for monitoring the progress of different transactions and the status of resources coupled through system logic 130.

Resources coupled through system logic 130 coordinate their operations through the exchange of transaction requests and responses, e.g. universal signals. IFs 210, 220, 230, and 240 often include modules that encode these signals to facilitate their transfer through system logic 130. In addition to transaction signals, signals indicating the status of resources accessed through IFs 210, 220, 230, and 240 or of buffers and queues within these IFs (architecture specific signals) may be used to coordinate and track transactions among the system resources. Observation system 160 monitors these signals (universal or architecture specific, encoded or unencoded) through dedicated lines or private buses (dashed lines) to provide data on the operation of system 100.

Figure 3A:
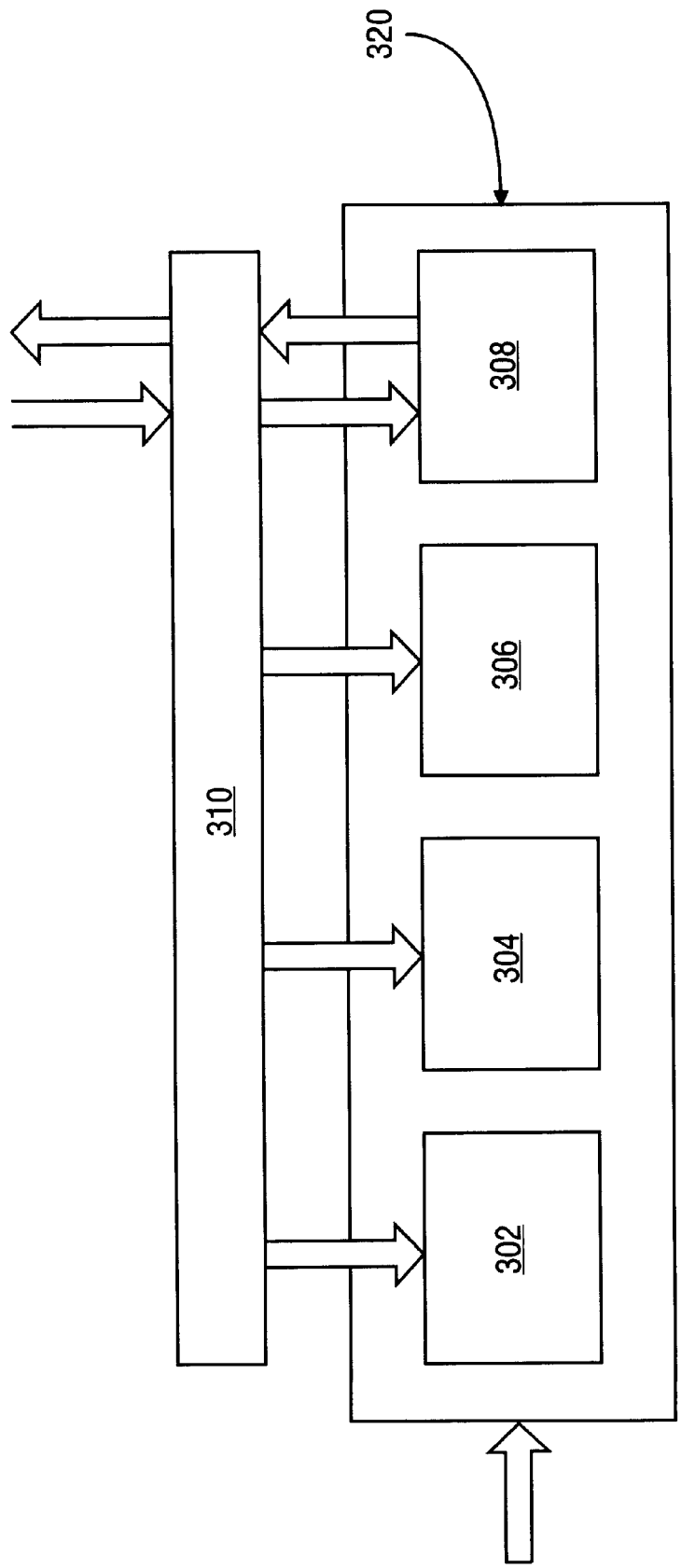
FIG. 3A is a block diagram of an observation system in accordance with the present invention.

Referring now to FIG. 3A, there is shown a block diagram of one embodiment of observation system 160. Observation system 160 includes a command interface 310 that transfers data and instructions between system 100 and an observation module 320. In the disclosed embodiment, command interface 310 receives event-monitoring instructions from bus 112 through memory-mapped registers (not shown). Command interface 310 includes logic to decode these instructions and generate appropriate control signals for observation module 320. The format of event-monitoring instructions is discussed below.

Observation module 320 includes an event-generation module 302, a selection module 304, a signal processing module 306, and a signal analysis module 308. Event generation module 302 generates event input signals that represent transaction and status signals detected in system 100. Selection module 304 is programmable to pass selected event input signals to signal processing module 306. Processing module 306 is programmable to condition event input signals and combine them to define event signals. Analysis module 308 is programmable to analyze event signals to determine frequencies, throughput, bandwidth, and queue depth information for selected event signals.

Figure 3B:
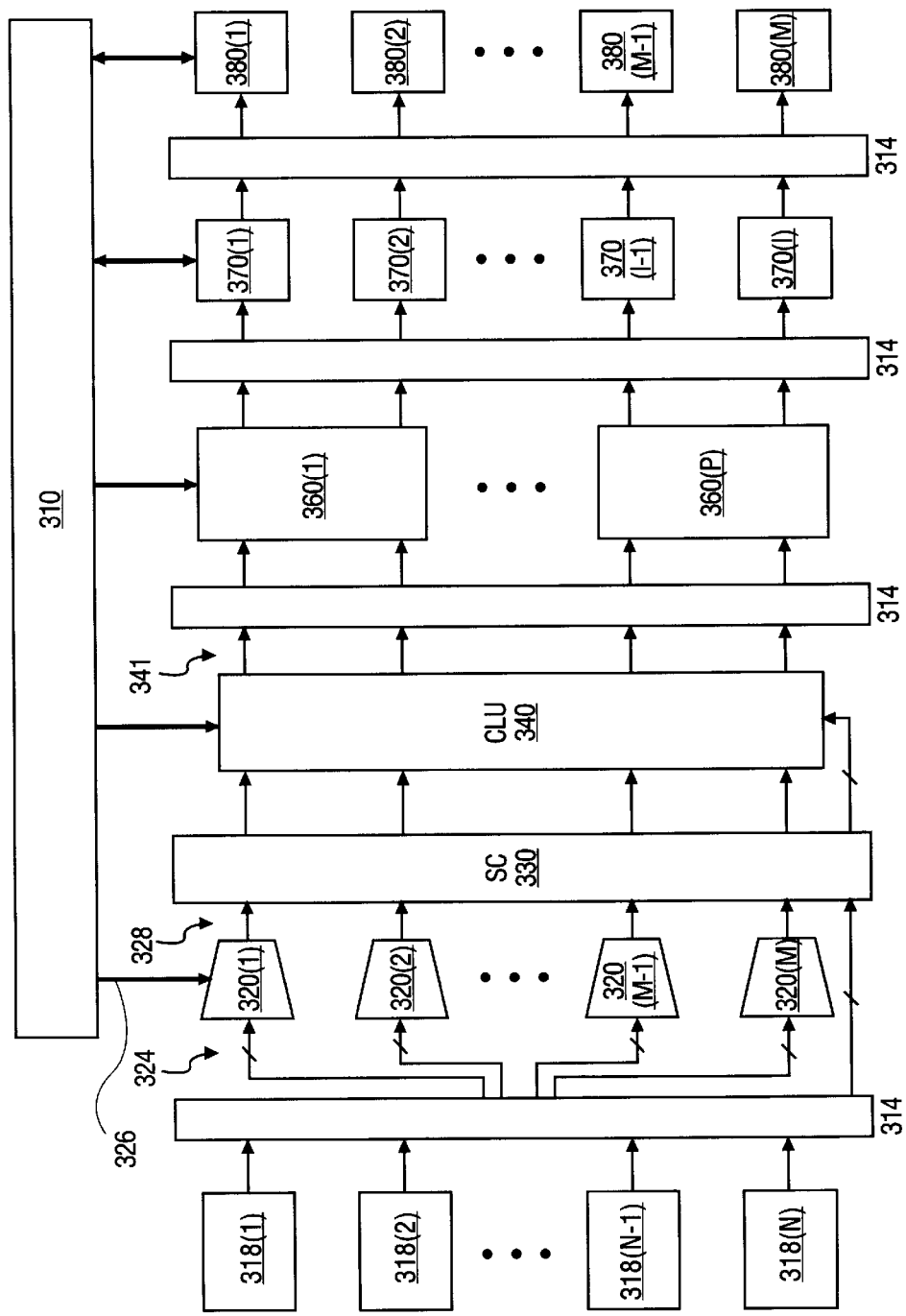
FIG. 3B is a block diagram of one embodiment of the observation system of FIG. 3A.

Referring now to FIG. 3B, there are shown embodiments of various components of observation module 320 of FIG. 3A. In the disclosed embodiment, event generation module 302 includes one or more event generators 318(1)–318(n) (collectively, event generators 318). Selection module 304 includes one or more programmable input selectors 320(1)–320(m) (collectively, input selectors 320). Processing module 306 includes a signal conditioning (SC) module 330 and a co-occurrence logic unit (CLU) 340, and analysis module 308 includes addend generators 360 and low and high order accumulators 370, 380. Vertical blocks 314 represent staging latches.

Event generators 318 are coupled to monitor signals at interfaces, queues, and control logic in the system logic and produce event input signals that characterize the monitored signals. In the disclosed embodiment, for example, event generators 318(1), 318(2) . . . 318(5) may monitor signals at processor IF 210, memory IF 220, bus IF 230, graphics IF 240, and communication hub 250, respectively. Monitored signals may be characterized as to the type of transaction at the interface and, where applicable, the amount and type of data being transferred. Event generators 318 may also monitor status-type signals generated by IFs 210, 220, 230, 240, hub 250, and associated control logic, and produce appropriate event input signals for analysis by observation system 160.

Figure 4:
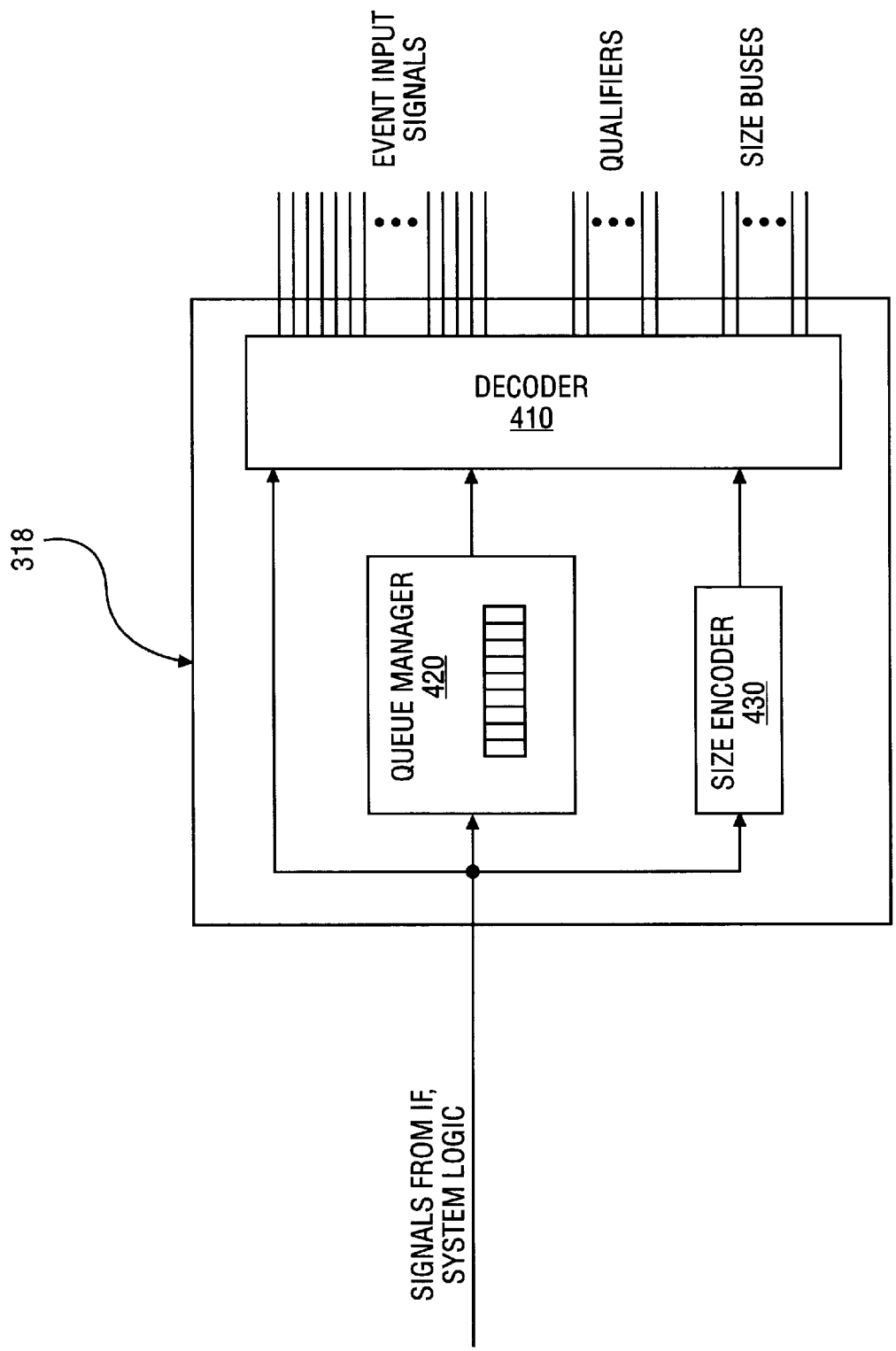
FIG. 4 is a block diagram of one embodiment of the event generator of FIG. 3B.

Referring now to FIG. 4, there is shown a block diagram of one embodiment of event generator 318. In the disclosed embodiment, event generator 318 includes a decoder 410, a request queue manager 420, and a size encoder 430. Decoder 410 translates signals detected at an associated IF into corresponding event input signals. Where applicable, size encoder 430 determines the size of a data block being transferred. Request queue manager 420 tracks the status of various outstanding transactions and generates corresponding status signals where appropriate. For example, request queue manager 420 may track deferred transactions and indicate when these transactions complete.

Referring now to Tables 1A and 1B, there are summarized examples of event input signals provided by event generators 318 in response to signals detected in exemplary computer system 100. Event input signals of Tables 1A and 1B are organized according to the IF of system logic 130 through which the corresponding transaction signals are coupled. Signal names in Tables 1A and 1B have the following general format:

source-2-destination_request-type_class.

Here, source indicates the resource at which the signal originates, destination indicates which resource is the target of the request, and request-type indicates the cycle type, e.g. read, write requests to memory or I/O. Class is an optional designation that further characterizes the signal according to selected criteria, such as the role of the signal in various pre-defined experiments (discussed below). Class designations include arrival (a), completion (c), event (e), and busy (b). For example, an _a or _c class designation indicates that the event signal represents the start or end, respectively, of a latency or bandwidth experiment.

TABLE 1A

| processor IF | | GRAPHICS PORT IF | |
|---|---|---|---|
| Arrivals/Completions | Events | Arrivals/Completions | Events |
| host_req_a | ioq_busy_e | a2m_req_a/c | agp_busy_e |
| c2m_req_a/c | normal_data_rspns_e | a2m_rd_a/c | agp_short_rd_e |
| c2m_wr_a/c | defer_rspns_e | a2m_wr_a/c | agp_long_rd_e |
| c2p_mreq_a/c | retry_rspns_e | | agp_priority_cmd_e |
| c2p1_mreq_a/c | no_data_rspns_e | | agp_short_cmd_e |
| c2p2_mreq_a/c | implicit_wb_rspns_e | | m-n_outstanding_e |
| c2p_io_req_a/c | snoop_e | | |
| p2m_req_a/c | defer_rply_e | | |
| p12m_req_a/c | dram_target_e | | |
| p22m_req_a/c | uswc_target_e | | |
| p12p2_wr_a/c | gatt_target_e | | |
| p22p1_wr_a/c | agp_src_target_e | | |
| | pci_src_target_e | | |
| | dffrd_transaction_e | | |
| | n_outstandin_e | | |
| | m-n_outstanding_e | | |

TABLE 1B

| BUS IF | | | MEMORY IF | |
|---|---|---|---|---|
| Arrivals | Durations | Events | Arrivals | Events |
| pn_request | pn_request_b | pn_req(i)_e | mem_req_a/c | tlb_ref_e |
| pn_mread | pn_mread_b | pn_grant(i)_e | mem_rd_a/c | tlb_miss_e |
| pn_mwrites | pn_mwrite_b | | mem_wr_a/c | tlb_hit_e |
| pn_io_rd | pn_io_rd_b | | | |
| pn_io_wr | pn_io_wr_b | | | |
| pn_interrupt | pn-interrupt_b | | | |

In Table 1B, "pn" refers to a peripherals bus such as the 33 or 66 MHz Peripherals Component Interface (PCI) buses for n equal to 1 or 2, respectively.

As discussed below arrivals and completion are used to track transactions on buses that support concurrent transactions. No arrivals and completions are indicated for PCI transacations because the PCI bus does not support concurrent transactions. Consequently, queue depth is always zero or one and transaction latencies can be determined by tracking the single transaction from start to finish.

The event input signals of Tables 1A and 1B provide a hierarchy for analyzing the operation of system 100 at different levels of detail. For example, the event input signal host_req is generated when any memory or input/output transaction from processor 110 is detected. The event input signal c2m_req is generated when any transactions between processor 110 and memory 120 are detected, and c2m_rd is generated only when a read transaction from processor 110 to memory 120 is detected. Similarly hierarchies exist for the other signals of Tables 1A and 1B. This allows event input signals to be defined as broadly or as narrowly as is required for a given analysis.

Event input signals may also be refined by selected qualifier signals. These qualifier signals represent additional information about an underlying transaction, such as whether a processor to memory read transaction targets data or instructions or whether targeted data is cacheable or uncacheable. Qualifier information is extracted from the underlying transaction and processed through observation module 320 with the corresponding event input signal. In the disclosed embodiment of observation module 320, event input signals and qualifier signals are combined by CLU 340, as discussed below.

Selection module 304 determines which of event input signals are passed to processing and analysis modules 304 and 306, respectively, for event analysis. In the embodiment of observation module 320 in FIG. 3B, selection module 304 includes one or more input selectors 320 for this purpose. Each input selector 320 includes a plurality of inputs, and each input is coupled to receive a selected event input signal from an event generator 318. A control input 326 transfers the signal on the selected inputs to processing module 304, according to an event-monitoring instruction at command interface 310. Input selectors 320 may be paired to pass specified event input signal pairs, and selected signals may be modified by conditioning module 330 to facilitate subsequent processing. This facilitates specification of event input signals for use in bandwidth, queue depth, and latency experiments.

Signal conditioning module 330 is programmable to perform logical operations on the selected event input signal(s) or convert the selected signal(s) into a format suitable for use by later stages of observation module 320. In one embodiment of the invention, signal conditioner 330 supports four operations on event input signals: no operation (NOP), invert, one-shot, and inverted one-shot. These operations may be implemented, for example, using a one-shot monostable flip flop.

CLU 340 receives (conditioned) event input signals and generates event signals when selected combinations of the (conditioned) event input signals are asserted. The selected combinations of event input signals represent transactions or events of interest in computer system 130. Because event signals can be generated by refining, conditioning, and combining various event input signals, they can represent events that are more complex and more fully specified than those represented by any of the monitored signals alone.

In one embodiment of CLU 340, event signals are specified as Boolean functions of the event input signals whose combination represents the event of interest. Boolean combinations of event input signals are selected through event monitoring instructions. In this embodiment of CLU 340, an event signal is asserted when the Boolean function representing the event of interest is true. In addition, each event input signal may be combined with one or more qualifiers associated with the underlying transaction/status condition to further specify the event being monitored. Qualified event signals may then be combined to represent the event of interest.

For example, an event of interest may be a collision between processor-to-memory and graphics system-to-memory request transactions. In this example, a2m_req and c2m_req event input signals are provided to input selectors 320(1) and 320(4), respectively, by event generators 318(1) and 318(4). An event-monitoring instruction that targets these transactions programs selectors 320(1), 320(4) to pass these event input signals to CLU 340. An event monitoring instruction also programs CLU 340 to asserts a corresponding event signal to analysis module 308 when these event input signals are asserted concurrently. If collisions between processor and graphics transactions of a specific type, e.g. memory reads of instructions or memory writes of uncacheable data, are of interest, CLU 340 may be further programmed to detect appropriately qualified event input signals and assert the event signal only when the additional conditions are met.

Figure 5A:
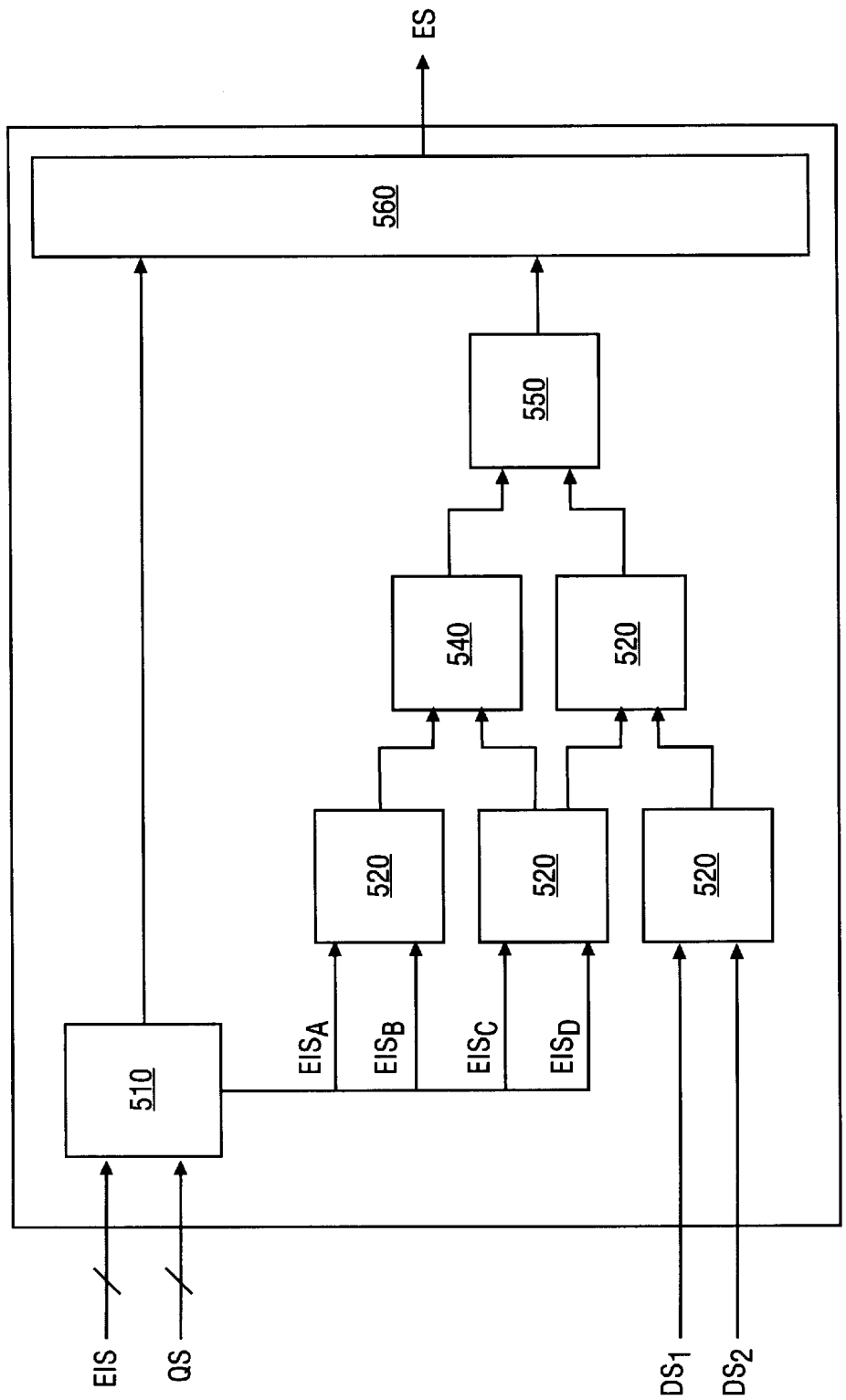
FIGS. 5A, 5B are block diagrams of one embodiment of the co-occurrence logic unit of FIG. 3.

Referring now to FIG. 5A, there is shown block a diagram of one embodiment of CLU 340. In the disclosed embodiment, CLU 340 includes a signal qualifier 510, set operators 520(a)–520(d) (collectively, set operators 520), an interval marker 540, a histogrammer 550, and a signal router 560. Signal qualifier 510 includes logic for combining an event input signal (EIS) with a qualifier signal (QS) to generate a qualified EIS (QEIS). In its simplest form, signal qualifier 510 may be an AND gate with EIS and QS applied to its inputs. QEIS may be provided to signal router 560 for coupling to analysis module 308, or it may be provided to a set operator 520, for combination with another EIS or QEIS.

Set operators 520 are programmable to generate signals representing Boolean combinations of event input signals applied to their inputs. In the disclosed embodiment, CLU 340 is shown with four 2-input set operators 520, although additional set operators may be included to provide greater functionality. Set operators 520(b), 520(c), 520(d) are coupled to generate Boolean combinations of up to 4 signals. In addition, interval marker 540 is coupled to receive input signals from set operators 520(a) and 520(b) and indicate the interval between assertion of the two input signals. The signal provided by each set operator 520(a), 520(b) represents a Boolean combination of up to two signals. In this embodiment, interval marker 540 is a one bit state machine that asserts an output signal when one of the input signals is asserted and deasserts the output signal when the other input signal is asserted.

Histogrammer 550 includes a counter and a comparator to sort signals at its input into defined intervals In the disclosed embodiment, histogrammer 550 may be driven by the output of either set operator 520(d) or interval marker 540. Accordingly, it may be used to track the duration of events specified by set operators 520(b), 520(c), 520(d) or intervals between events specified by set operators 520(a) and 520(b).

Figure 5B:
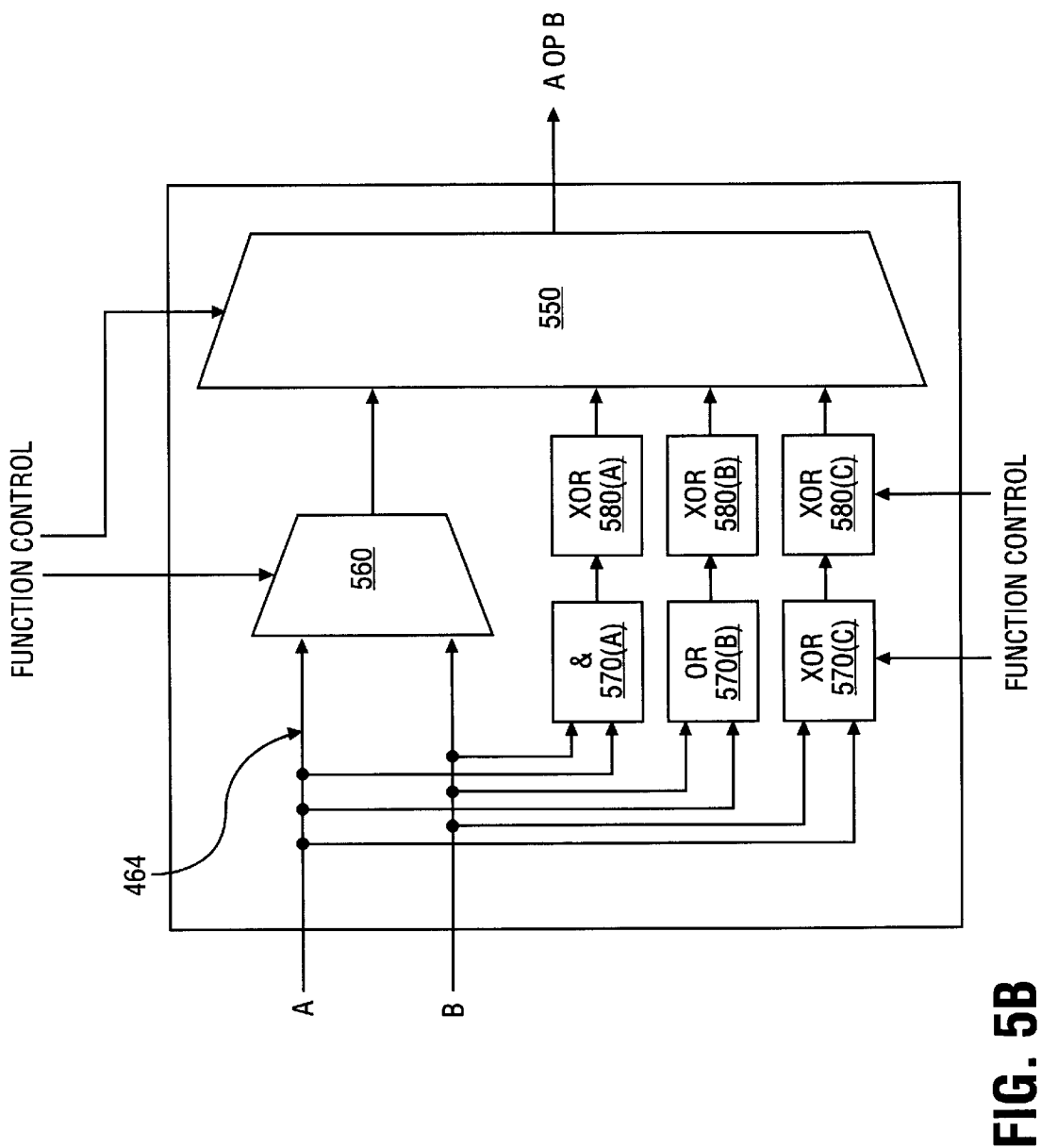

Referring now FIG. 5B, there is shown a block diagram of an embodiment of set operator 520. Set operator 520 comprises multiplexers 522, 524, XOR logic gates 526(a)–526(c) (collectively, XORs 526), as well as AND gate 528(a), OR gate 528(b), and XOR gate 528(c) (collectively, logic gates 528). Multiplexers 522, 524, XORs 526 and logic gates 528 are programmable through function control signals generated by command interface 310. For example, the event signal representing (Q)EIS$_C$ OP (Q)EIS$_D$ is asserted when (conditioned, qualified) event input signals (Q)EIS$_C$ and (Q)EIS$_D$ make the logic equation true. The disclosed embodiment of set operator 520 can generate event signals representing (Q)EIS$_C$ and (Q)EIS$_D$ individually, as well as Boolean combinations of these EISs, in which OP is AND, NAND, OR, NOR, XOR, XNOR.

DS represents duration signals. These are level triggered signals that remain in a specified state as long a specified condition is true. EIS signals, on the other hand, are typically pulsed signals that change state temporarily when an associated event occurs.

CLU 340 thus allows event signals to be defined by the assertion/deassertion of one or more event input signals associated with system logic 130. Boolean combinations of selected signals can be used to identify very specific events in computer system 100, including the co-occurrence of two or more specific events.

Event signals from processing module 306 may be further processed by analysis module 308 of observation module 320. In the disclosed embodiment, analysis module 308 includes addend generators 360 and accumulators 370, which may be programmed to track occurrences of selected event signals or perform experiments based on selected event signals. Accumulators 370 are shown coupled to higher order accumulators 380, respectively, in a pipelined configuration. This allows tracking of event data at higher rates than is possible for single stage accumulators, but it is not required for the present invention.

Addend generators 360 and accumulators 370, 380 allow observation module 320 to simultaneously accumulate data on multiple event signals. Information on, for example, the queue depth at registers in selected resources and the latency of selected operations implemented by these resources may be determined from differences between selected arrival and completion events. Event input signals in Tables 1A and 1B may serve to indicate either arrival (a) or completion (c) events. Arrival events include, for example, signals indicating receipt of read and write requests at queues associated with various resources in computer system 100. The corresponding completion events include signals indicating completion of the read and write requests, e.g. receipt of requested data or data successfully transferred to the target.

The queues in system logic 130 typically service multiple resources. Accordingly, latency and queue depth data is extracted by monitoring arrivals and completions in the queue of interest over a selected interval. For example, the average latency (S) of request is given by:

$$S = \frac{\sum_i (A - C)}{C}$$

Here, A and C are the number of arrivals and completions, respectively, that have occurred during an observation interval, T. The difference between A and C is accumulated on a per clock cycle (i) basis to yield the busy time B during T. C is a running count of the number of completions during T.

Observation system 160 generates latency data by tracking arrival and completion events, determining the difference between stored values on each clock cycle, summing the difference (busy time) in a first accumulator 370, and summing the number of completions in a second accumulator 370. The busy time may also be used to determine the average queue depth for a resource by tracking the number of arrival event signals in the second accumulator. Bandwidth data may be generated by tracking the size of arriving data transactions in first accumulator 370 and the number of arrivals in second accumulator 370.

Figure 6:
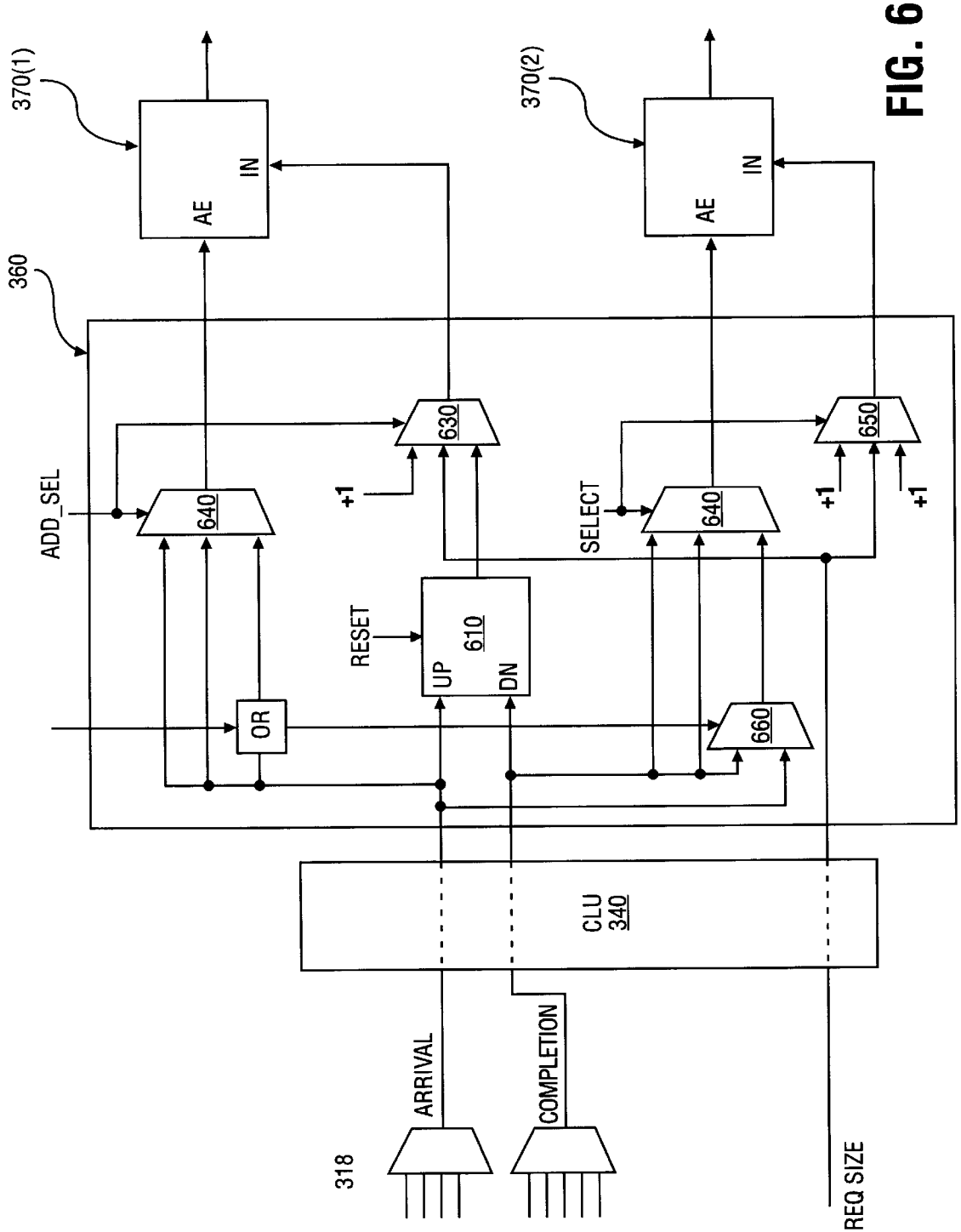
FIG. 6 is a circuit diagram of one embodiment of the addend generator of FIG. 3.

Referring now to FIG. 6, there is shown one embodiment of addend generator 360 that is programmable to implement the above described latency, queue depth, and bandwidth experiments. Also shown is the coupling between addend generator 360, CLU 340 and accumulators 370.

Addend generator 360 includes an up/down counter for tracking the number of outstanding requests in the system. These requests are represented by arrival and completion event signals applied to inputs UP, DN. MUXs 620, 630, 640, 650 are programmable to couple various event signals, including those driving UP, DN inputs of counter 610, to accumulators 370. In the disclosed embodiment, the event signals are shown as arrival and completion event signals provided through a pair of input selectors 318(1), 318(2). These signals are used to illustrate latency and queue depth experiments with the understanding that other event signals, e.g. event input signal combinations defined using CLU 340, may be similarly analyzed or accumulated by addend generator 360 and accumulators 370.

MUXs 620 and 640 couple selected event signals to enable accumulators 370(1), 370(2), respectively, via inputs AE. MUXs 630 and 650 couple signals selected to be tracked to data inputs (IN) of accumulators 370(1), 370(2), respectively. Control inputs of MUXs 620, 630, 640, 650 are coupled to a control signal, which selects the various input signals according to a type of experiment to be run. A MUX 660 selects one of the event signals input to MUX 640.

In the disclosed embodiment, different event signal analyses are triggered by a select signal (ADD_SEL) applied to MUXs 620, 630, 640, and 650. For example, if the a-inputs of MUXs 620, 630, 640, 650 are selected, events A and C are tracked in accumulators 370(1) and 370(2), respectively. If the b-inputs of MUXs 620, 630, 640, and 650 are selected, data sizes transferred by A events are tracked in accumulator 370(1) and the number of A events are tracked in accumulator 370(2). This data can be used to provide bandwidth data for A events.

The latency of an event initiated by an A event and completed by a C event may be determined by selecting c-inputs of MUXs 620, 630, 640, 650 and a-input of MUX 660. In this case, accumulator 370(1) tracks outstanding requests or busy time (the difference between arrivals (A) and completions (C)), while accumulator 370(2) tracks completions. The latency is provided by the ratio of the busy time for an interval to the number of completions during the interval. If b-input of MUX 660 is selected instead, accumulator 370(2) tracks A events, which can be combined with the busy time (accumulator 470(1) to indicate the queue depth.

Addend generator 370 thus provides programmable structures for manipulating event signals defined by input selectors 318 and, if necessary, CLU 340. Alternative embodiments of observation module 320 may employ different logic combinations for analyzing event output signals from CLU 340. For example, counters and subtraction logic may be used in conjunction with accumulators 370, 380 to further analyze event output signals.

Figure 7:
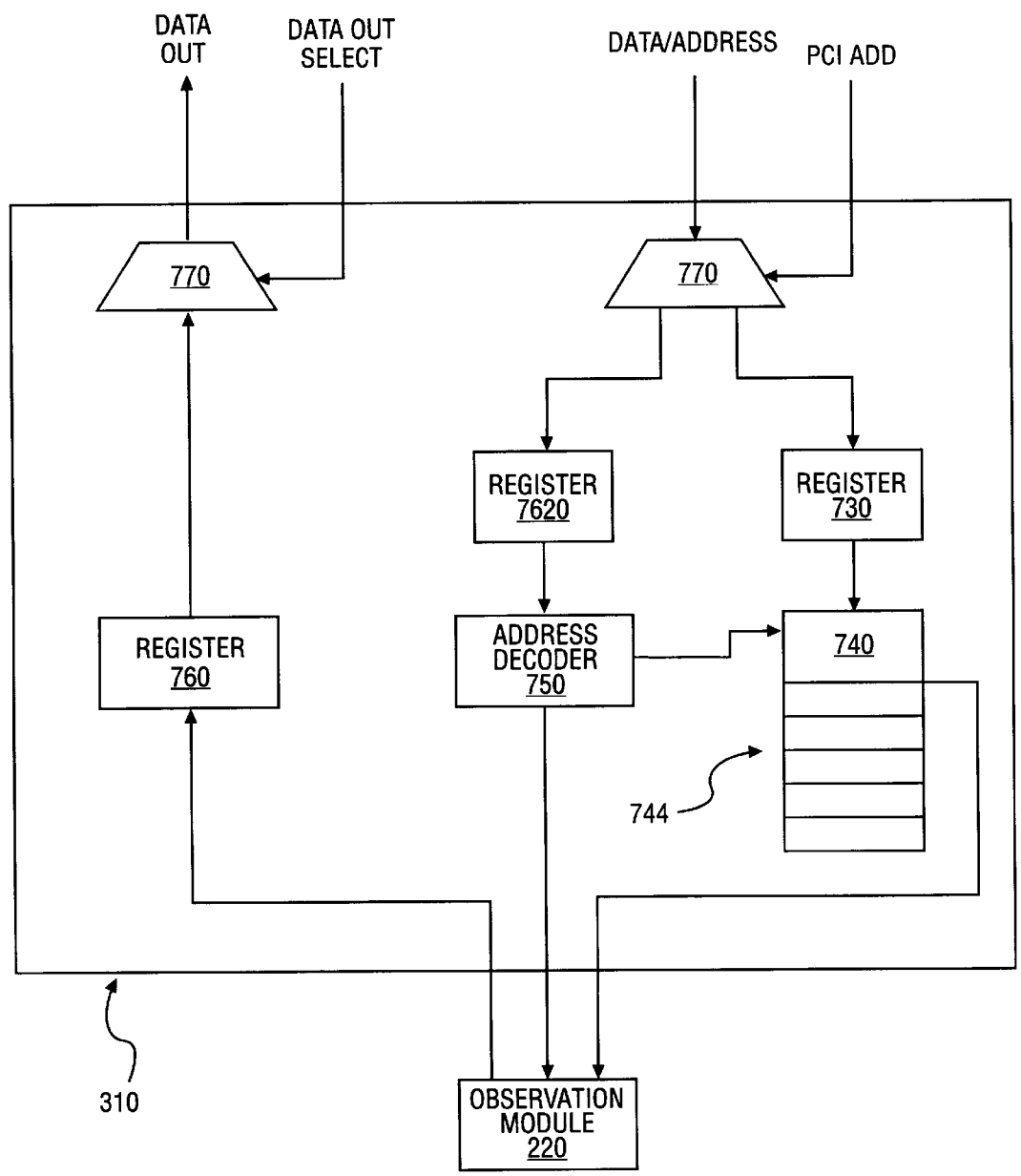
FIG. 7 is a block diagram of one embodiment of the command interface of FIG. 3.

Referring now to FIG. 7, there is shown an embodiment of command interface 310 for receiving event-monitoring instructions and generating appropriate control signals to the components of observation module 320. Interface 310 couples instructions and related data between observation module 320 and bus 112. The signals coupled through interface 310 include event-monitoring instructions (EMIs) and a strobe signal. Each EMI includes fields (FIGS. 8A–5D) that indicate the type of operation to be performed by observation module 320 and the components of observation module 320 involved. The strobe signal indicates when the EMI is valid.

Processor 110 of system 100 uses memory or port mapped I/O to deliver event-monitoring instructions and other data to command interface 310 via bus 112, where they are coupled to the input of a demultiplexer (DEMUX) 710. The outputs of DEMUX 710 couple data to address and instruction/data registers 720 and 730, respectively, according to the state of a signal (P_ADD) applied to the control input of DEMUX 710. An address decoder 750 directs instructions and data, e.g. reset values for accumulators 370, 380, to instruction decoder 740 and data registers 744, respectively, according to an address received register 720. Instruction decoder 740 includes circuitry that generates control signals to the components of observation module 320 according to data provided by the EMI. These control signals may, for example, reset addend generator 360, couple a selected input of selector 320 to signal conditioner 330, or identify to CLU 340 one or more signal combinations to be detected and signaled to addend generator 360. Instruction decoder 740 is triggered on receipt of a new command from register 730.

Data generated by observation module 320, such as bandwidth, latency, or event frequency information, is provided to bus 112 through MUX 770. In the disclosed embodiment, this data may be buffered in a register 760 and latched to bus 112 by a signal applied to the control input of MUX 770.

A basic set of event-monitoring instructions suitable for programming observation system 160 are summarized in Table 2. This table indicates the arguments specified in each instruction and the purpose (use) of the instruction. These instructions are discussed below in conjunction with FIGS. 8A–8D.

of the invention, signal select field 818 includes a group-select sub-field and a signal-select sub-field to indicate a general group of signals and a specific signal in the signal group, respectively. Instruction decoder 740 of command interface 310 converts data in signal select field 818 into an appropriate control signal for selector 320. A condition field 816 indicates any logical or other types of operations to be performed on the selected event input signal by signal conditioner 330.

Figure 8A:
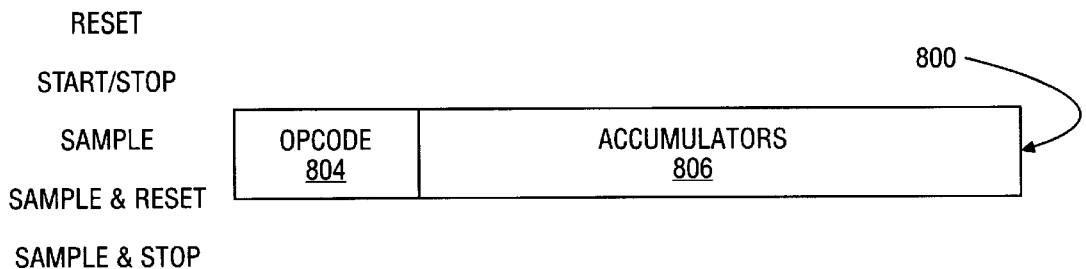
FIGS. 8A–8D are block diagrams representing selected event-monitoring instructions for use with the present invention.
Figure 8B:
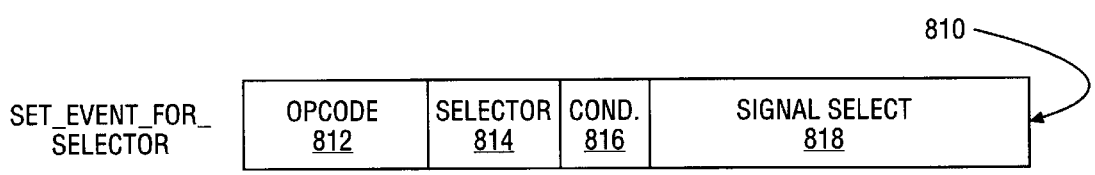
Figure 8C:
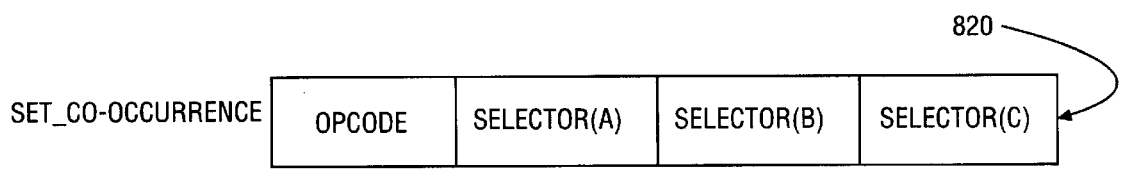

Referring now to FIG. 8C, there is shown a block diagram of a Set_Co-occurrence instruction (SCI) 820, suitable for setting up CLU 340 to detect selected signal combinations. SCI 820 includes an opcode field 822, a register address field 824, and a register value field 828. Opcode field 822 indicates to decoder 740 the instruction type (SCI). Register address field 824 identifies a register associated with one of the resources of CLU 340, e.g. set operators 520, signal qualifier 510, for programming the resource. Register value field 828 includes a value that encodes, for example, a selected Boolean operation to be implemented by the identified resource. This value is written to the identified register to program the associated resource.

Figure 8D:
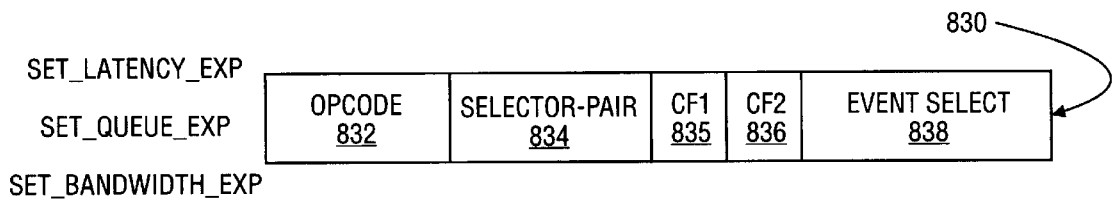

Referring now to FIG. 8D, there is shown a block diagram of a Set_X_Experiment instruction (SXI) 840, where X

TABLE 2

| | INSTRUCTION | ARGUMENT(S) | USE |
|---|---|---|---|
| 1 | Reset | resource-list | synchronous reset of addend generators/accumulators |
| 2 | Start/Stop | resource-list | start & stop addend generator/accumulator |
| 3 | Sample | resource | sample addend generator/accumulator |
| 4 | Sample & Reset | resource | sample & reset addend generator/accumulator |
| 5 | Sample & Stop | resource | sample addend generator/accumulator & inhibit |
| 6 | Sample Overflow | overflow bits | sample the overflow bits |
| 7 | Set Sample | resource | set the sample register to shadow the OS data register |
| 8 | Set_Event_For_Selector | monitored signal(s) | set-up input signal selector & associated signal conditioner |
| 9 | Set_Co-Occurrence | CLU resgister & value | set up CLU (function control inputs) |
| 10 | Set_Addend | addend selectors, latency/queue bits | set up addend selectors (MUXs 620, 630, 640, 650, 660) |
| 11 | Set_Latency_Experiment | latency selector pair, signal conditioning, event | set up latency experiment |
| 12 | Set_Queue_Experiment | queue selector pair, signal conditioning, event | set up queue experiment |
| 13 | Set_Bandwidth_Experiment | bandwidth group signal | set up bandwidth experiment |

Referring now to FIG. 8A there is shown a block diagram of an EMI 800 suitable for instructions 1–7 of Table 2. This instruction controls accumulators 370, 380 of observation system 300 and includes an operation code (Opcode) field 804 and an accumulator field 806 for this purpose. Opcode field 804 indicates which of instructions 1–7 is being executed, while accumulator field 806 indicates the targeted accumulator. For example, A Reset instruction the indicated accumulator(s) to a starting value, which is typically zero. Sample & reset causes the contents of the indicated accumulator(s) to be read and the accumulator(s) reset. Sample causes the contents of the indicated accumulator(s) to be sampled without resetting.

Referring now to FIG. 8B, there is shown a block diagram of a Set_Event_Instruction (SEI) 820. SEI 820 indicates which event input signals are to be tracked. Opcode field 812 identifies the type instruction, i.e. SEI. A selector address field 814 indicates which selector 320 is being used, while a signal select field 818 indicates which input of the selector is to be coupled to processing logic 306. In one embodiment refers to various experiments that are specified using the same data format, e.g. instructions 11–13 of Table 2. In the disclosed embodiment, X may indicate a latency experiment, a queue depth experiment, or a bandwidth experiment. In each case, SXI 830 includes an opcode field 832, a selector-pair field 834, conditioning fields 836, 837, and an event select field 838. Opcode field 832 identifies the instruction type (SXI) to decoder 740. Selector field 834 indicates a set of input selectors 322 that receive the targeted event input signals, and event select field 838 indicates the specific inputs of the indicated input selectors 322 that receive the targeted event input signals. These event input signal pairs may be selected from a list of encoded signal pairs.

In a latency experiment, for example, one selector 320 of the pair will be programmed to select an event input signal representing an arrival event, while the other selector 320 of the pair will be programmed to select an event input signal representing a completion event. In a bandwidth experiment, one selector 320 of the pair will select an event input signal and the other selector 320 will select a data signal that provides information on the data block size transferred by the associated event. In the disclosed embodiment of observation system 160, this data block information is provided by the size encoder of event generator 318. Conditioning fields 846, 847 indicate any conditioning, e.g. unary logic operations, to be applied to the selected event input and data block signals.

There has thus been provided an observation system that is programmable to monitor and analyze the performance of a computer system. The observation system includes a command interface and an observation module that is coupled to monitor various transaction and status signals associated with the resources of the computer system. The command interface decodes event monitoring instructions and controls logic in the observation module to select and processes signals in accordance with the decoded instructions.

What is claimed is:

1. A system for monitoring transactions between resources in a computer, the system comprising:

system logic to receive signals associated with the transactions between resources;

a command interface to receive an event-monitoring instruction and generate control signals responsive to the received instruction;

an event generator to generate event input signals responsive to the received signals;

an input selector to select one or more of the event input signals responsive one of the control signals; and a co-occurrence logic unit (CLU) to generate an event output signal from the selected event input signals responsive to another of the control signals.

2. The system of claim 1, wherein the CLU is programmable to detect event input signals that occur in a specified relationship.

3. The system of claim 2, wherein the relationship between the event input signals is specified through a Boolean function.

4. The system of claim 1, further comprising an addend generator and an accumulator to receive the event output signal and to analyze the event output signal according to the event monitoring instruction.

5. The system of claim 1, wherein the command interface is coupled to receive event monitoring instruction through memory mapped I/O.

6. An observation system for monitoring the performance of a computer system through a system logic device of the computer system, the observation system comprising:

an instruction decoder to generate control signals in response to an event-monitoring instruction;

an event generator coupled to an interface in the system logic device to monitor signals associated with the interface and generate event input signals when selected monitored signals are detected; and a co-occurrence logic unit (CLU) to receive two or more selected event input signals and to generate an event output signal when the selected event input signals satisfy a condition, responsive to the control signals.

7. The observation system of claim 6, wherein the condition to be satisfied is an occurrence of two or more selected event input signals at the same time.

8. The observation system of claim 6 further comprising an accumulator to track each occurrence of the generated event output signal.

9. The observation system of claim 6, wherein the event input signal provided by the event generator indicates a transaction type and an amount and type of data associated with the transaction.

10. A computer system comprising:

system logic to route transactions among component resources in the computer system;

a command interface to decode event monitoring instructions;

an observation module including a co-occurrence logic unit to detect selected combinations of signals associated with the transactions routed through the system logic responsive to the event monitoring instructions.

11. The computer system of claim 10, wherein the observation module includes an event generator to generate an event input signal if a specified signal associated with the transactions is detected at the system logic and wherein a first event monitoring instruction indicates the specified signal.

12. The computer system of claim 11, wherein a second event monitoring instruction indicates the selected combination of signals.

* * * * *

UNITED STATES PATENT AND TRADEMARK OFFICE
CERTIFICATE OF CORRECTION

PATENT NO.   : 6,115,682
DATED        : September 5, 2000
INVENTOR(S)  : Omtzigt It is certified that error appears in the above-identified patent and that said Letters Patent is hereby corrected as shown below:

Column 10,
Line 52, delete "bus 112" and insert -- bus 142 --.

Column 11,
Line 14, delete "bus 112" and insert -- bus 142 --.
Line 55, delete "instruction the" and insert -- instruction resets the --.

Column 14,
Line 43, delete "claim 11, wherein" and insert -- claim 10, wherein --.

Signed and Sealed this

Twenty-fourth Day of September, 2002

*Attest:*

JAMES E. ROGAN
*Attesting Officer*   *Director of the United States Patent and Trademark Office*